US010954323B2

(12) United States Patent
Fang et al.

(10) Patent No.: US 10,954,323 B2
(45) Date of Patent: Mar. 23, 2021

(54) FLUORINE CONTAINING POLYMERS

(71) Applicant: MERCK PATENT GMBH, Darmstadt (DE)

(72) Inventors: Haibo Fang, Shanghai (CN); Reiner Friedrich, Seeheim-Jugenheim (DE)

(73) Assignee: MERCK PATENT GMBH, Darmstadt (DE)

( * ) Notice: Subject to any disclaimer, the term of this patent is extended or adjusted under 35 U.S.C. 154(b) by 99 days.

(21) Appl. No.: 16/310,709

(22) PCT Filed: Jun. 14, 2017

(86) PCT No.: PCT/EP2017/064478
§ 371 (c)(1),
(2) Date: Dec. 17, 2018

(87) PCT Pub. No.: WO2017/216201
PCT Pub. Date: Dec. 21, 2017

(65) Prior Publication Data
US 2019/0322776 A1   Oct. 24, 2019

(30) Foreign Application Priority Data
Jun. 17, 2016 (CN) .......................... 201610436016.6

(51) Int. Cl.
*C08F 20/38* (2006.01)
*C08F 20/28* (2006.01)
*C09D 5/00* (2006.01)
*C09D 133/16* (2006.01)
*C09D 163/00* (2006.01)
*D06M 15/277* (2006.01)
*D06M 101/06* (2006.01)
*D06M 101/32* (2006.01)

(52) U.S. Cl.
CPC .............. *C08F 20/38* (2013.01); *C08F 20/28* (2013.01); *C09D 5/00* (2013.01); *C09D 133/16* (2013.01); *C09D 163/00* (2013.01); *D06M 15/277* (2013.01); *D06M 2101/06* (2013.01); *D06M 2101/32* (2013.01)

(58) Field of Classification Search
CPC .......... C09D 133/16; C09D 4/06; C09D 5/00; C09D 163/00; C08F 20/24; C08F 20/38; C08F 20/28; C03C 17/32
USPC ........................................................ 524/508
See application file for complete search history.

(56) References Cited

U.S. PATENT DOCUMENTS

| 2003/0109626 | A1 | 6/2003 | Bradley et al. |
| 2005/0107645 | A1 | 5/2005 | Furukawa |
| 2005/0113609 | A1* | 5/2005 | Furukawa ............... C07C 43/17 568/685 |
| 2009/0176942 | A1 | 7/2009 | Ishikawa et al. |
| 2017/0349760 | A1 | 12/2017 | Friedrich |

FOREIGN PATENT DOCUMENTS

| EP | 0154894 B1 | 4/1988 |
| GB | 1224774 A | 3/1971 |
| JP | 50052019 A | 5/1975 |
| JP | 2012087092 A | 5/2012 |
| WO | WO 2016/010742 * | 1/2016 |
| WO | 2016032738 A1 | 3/2016 |
| WO | 2016096129 A1 | 6/2016 |

OTHER PUBLICATIONS

International Search Report PCT/EP2017/064478 dated Oct. 11, 2017 (pp. 1-2).
Chinese office action in application No. 201780034801.0 dated Sep. 7, 2020 (pp. 1-14).
Indian office action in Application No. 201937001534 dated Jan. 1, 2021 (pp. 1-14).

* cited by examiner

*Primary Examiner* — Doris L Lee
(74) *Attorney, Agent, or Firm* — Millen White Zelano & Branigan, PC; Brion P. Heaney

(57) ABSTRACT

The present invention relates to novel fluorine containing polymers, compositions comprising the polymers, the use of the polymers in coatings, especially in water and dirt repellent coatings, and products coated with polymer containing coatings.

22 Claims, 2 Drawing Sheets

FLUORINE CONTAINING POLYMERS

The present invention relates to novel fluorine containing polymers, compositions comprising the polymers, the use of the polymers in coatings, especially in dirt-repellent coatings, and products coated with polymer containing coatings.

Dirt-repellent coatings are a vital part for many technical applications. Often fluorinated material are used, because they have the unique characteristics of providing oil and water repellency at the same time. Out-door equipment, technical protection clothing like fireman suits, bullet proofed jackets or scrubs are only a few examples for these applications.

For dirt repellent coatings perfluorinated monomers based on C6 Chemistry are often used. These fluorinated materials cause environmental concerns at regulatory authorities around the world. Owing to the chain length of the perfluorinated part, compounds of this type are potentially bioaccumulative, persistent and toxic. Shorter perfluorinated alkyl chains having 2-5 carbon atoms are known to be less toxic and bioaccumulative, but exhibit inadequate efficacy.

There continues to be a demand for alternative fluorinated materials for coatings.

Novel polymers have now been found which are suitable for functional coatings to improve dirt pick up in epoxy, acrylic and PUR coatings as well as on garment or leather and which are beneficial in terms of their eco toxicological profile.

The present invention relates to polymers comprising monomer units derived from at least one monomer of formulae (I) or (II)

$$(Rf_1—CHF—CF_2—O—CHR_1)_{m1}\text{-}L_1\text{-}(X_1)_{n1} \quad (I)$$

$$(Rf_2—CHF—CF_2—S—CHR_2)_{m2}\text{-}L_2\text{-}(X_2)_{n2} \quad (II)$$

wherein $Rf_1$ and $Rf_2$ are independently of one another a perfluorinated, preferably heteroatoms containing, alkyl group,
$R_1$ and $R_2$ are independently of one another H or an alkyl group,
$L_1$ and $L_2$ are independently of one another a single bond or a bivalent organic group,
$X_1$ and $X_2$ are independently of one another an ethylenically unsaturated group,
$m_1$ and $m_2$ are independently of one another $\geq 1$
and $n_1$ and $n_2$ are independently of one another $\geq 1$.

The new polymers may comprise one or more of the monomers of formula (I) or one or more of the monomers of formula (II) or a combination of one or more of the monomers of formula (I) and one or more of the monomers of formula (II).

Preferably, $Rf_1$ and $Rf_2$ are independently of one another selected from the following groups:
$CF_3—(CF_2)_{0-3}—$, $CF_3—(CF_2)_{0-3}—O—$,
$CF_3—(CF_2)_{0-3}—O—(CF_2)_{1-3}—$,
$CF_3—(CF_2)_{0-3}—O—(CF_2)_{1-3}—O—$,
$CF_3—(CF_2)_{0-3}—O—(CF_2)_{1-3}—O—CF_2—$,
$CF_3—(CF_2)_{0-3}—O—(CF_2—O)_{1-8}—$ and
$CF_3—(CF_2)_{0-3}—O—(CF_2—O)_{1-8}—CF_2—$.

In an especially preferred variant of the invention, $Rf_1$ and $Rf_2$ are independently of one another selected from the following groups:
$CF_3—(CF_2)_{1-2}—$, $CF_3—(CF_2)_{1-2}—O—$,
$CF_3—O—(CF_2)_{1-3}—$,
$CF_3—O—(CF_2)_{1-2}—O—$,
$CF_3—(CF_2)_{1-2}—O—CF_2—$,
$CF_3—O—(CF_2)_{1-2}—O—CF_2—$,
$CF_3—O—(CF_2—O)_{1-8}—$ and
$CF_3—O—(CF_2—O)_{1-8}—CF_2—$.

Preferably, $R_1$ and $R_2$ are independently of one another selected from H and C1-C3 Alkyl.

Preferably, $L_1$ and $L_2$ are independently of one another selected from a single bond and a saturated, branched or not branched, optionally hetero atoms, especially O and/or S atoms, and/or functional groups containing, organic group, especially an alkylene group.

Preferably, $X_1$ and $X_2$ are independently of one another an acrylate or a methacrylate group.

Preferably, $m_1$ and $m_2$ are independently of one another 1-3, particularly 1-2.

Preferably, $n_1$ and $n_2$ are independently of one another 1-3, particularly 1.

Preference is given to polymers comprising monomer units derived from at least one monomer of formulae (I) and/or (II) wherein one or more of variables have the preferred meaning. Especially preferred are polymers comprising monomer units derived from at least one monomer of formulae (I) and/or (II) wherein all of the variables simultaneously have the preferred meaning.

Particular preference is given to compounds of formulae (I) and (II) with:
$Rf_1$ and $Rf_2$ are independently of one another selected from $CF_3—(CF_2)_{1-2}—$, $CF_3—(CF_2)_{1-2}—O—$, $CF_3—O—(CF_2)_{1-3}—$, $CF_3—O—(CF_2)_{1-3}—O—$, $CF_3—(CF_2)_{1-2}—O—CF2$-, $CF_3—O—(CF_2)_{1-2}—O—CF_2—$, $CF_3—O—(CF_2—O)_{1-8}—$ and $CF_3—O—(CF_2—O)_{1-8}—CF_2—$,
$R_1$ and $R_2$ are independently of one another H or $CH_3$,
$L_1$ and $L_2$ are independently of one another a single bond or a C1-C4 alkylene group, optionally branched and/or comprising hetero atoms,
especially O or S, and/or a functional group,
$X_1$ and $X_2$ are independently of one another an acrylate or a methacrylate group
and m=1 or 2 and n=1.

Especially preferred are polymers comprising monomer units derived from at least one monomer selected from the following formulae (Ia) to (Id), especially (Ia) to (Ic), and/or (IIa) to (IIc).

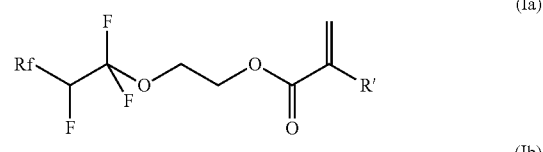

(Ia)

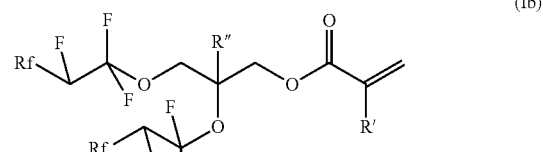

(Ib)

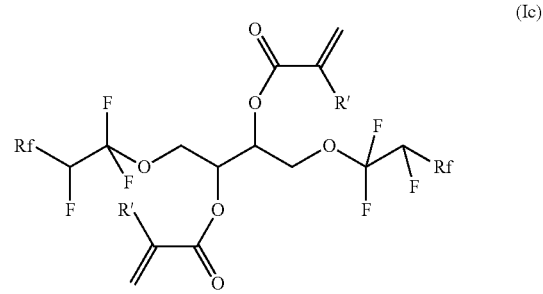

(Ic)

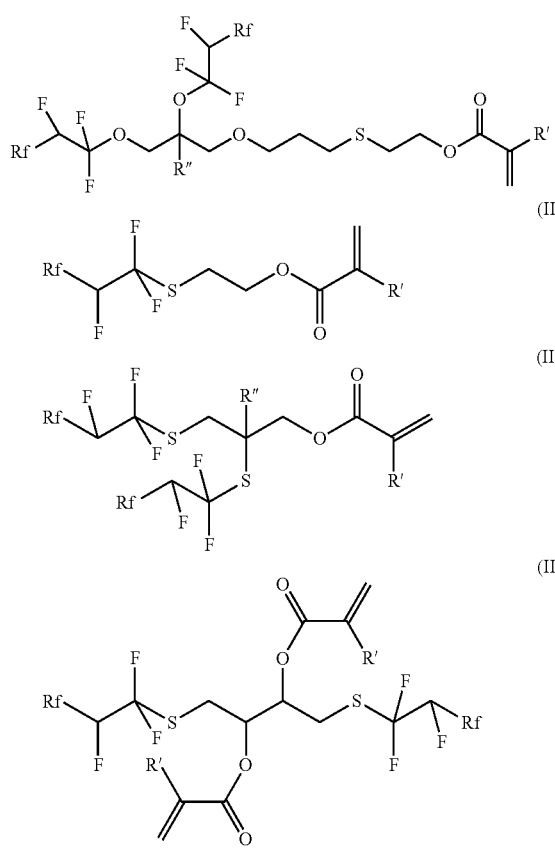

wherein
Rf is a perfluorinated, optionally heteroatoms containing, alkyl group and R' and R" are independently of one another H or an alkyl group.

Particularly preferred are polymers comprising monomer units derived from at least one monomer selected from formulae (Ia) to (Ic) and/or (IIa) to (IIc) wherein Rf is
$CF_3—(CF_2)_{1-2}—$, $CF_3—(CF_2)_{1-2}—O—$,
$CF_3—O—(CF_2)_{1-3}—$,
$CF_3—O—(CF_2)_{1-2}—O—$,
$CF_3—(CF_2)_{1-2}—O—CF_2—$,
$CF_3—O—(CF_2)_{1-2}—O—CF_2—$,
$CF_3—O—(CF_2—O)_{1-8}—$ or
$CF_3—O—(CF_2—O)_{1-8}—CF_2—$
and R' and R" are independently of one another H or methyl.

In an especially preferred variant of the invention, the polymers comprise monomer units derived from at least one monomer selected from formulae (Ia) to (Ic) and/or (IIa) to (IIc) wherein Rf is
$CF_3—(CF_2)_{1-2}—$,
$CF_3—(CF_2)_{1-2}—O—$,
$CF_3—O—(CF_2)_{1-3}—$
or $CF_3—O—(CF_2)_{1-2}—O—$
and R' and R" are independently of one another H or methyl.

Preferably, the polymers comprise monomer units derived from at least one monomer selected from formulae (Ia) to (Ic) and/or (IIa) to (IIc) wherein Rf is $CF_3—CF_2—CF_2—O—$, $CF_3—CF_2—O—$ or $CF_3—O—$ and R' and R" are independently of one another H or methyl.

Particular preference is given to polymers comprising monomer units derived from at least one monomer selected from the following monomers:

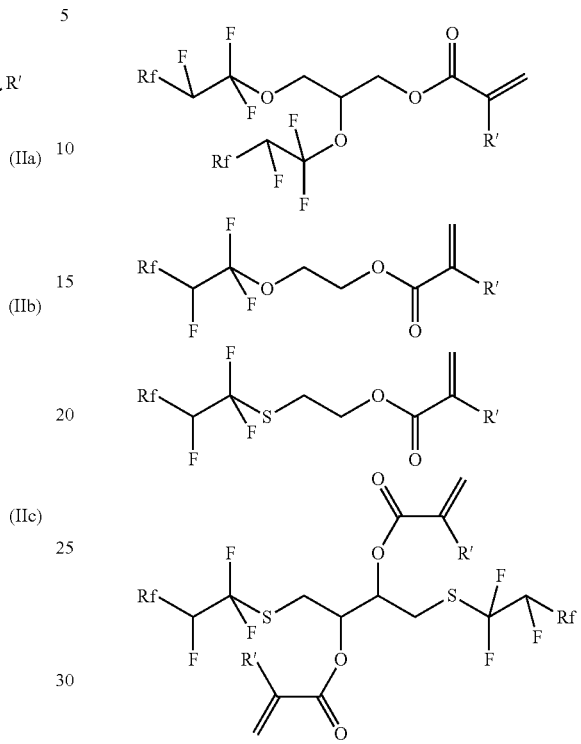

The compounds of formulae (I) and (II) can be prepared by simple, standard process steps. For example, compounds of formula (I) can be prepared by reaction of corresponding alcohols with acids or acid anhydrides by methods known to the skilled man in the art.

Compounds of formula (II) can be prepared by reaction of the corresponding perfluoroolefins with the corresponding thiocompounds.

Necessary starting materials are commercially available, can be prepared by known processes from commercially available products or can be prepared analogously by known syntheses, Compounds according to formulae (I) and (II) and processes for their preparation are described in WO 2016/096129.

The new polymers may comprise solely monomer units derived from at least one functional co-monomer of formulae (I) and/or (II).

In a variant of the invention, the new polymers may comprise monomer units derived from at least one functional co-monomer of formulae (I) and/or (II) and at least one functional co-monomer and/or at least one non-functional co-monomer. Such co-polymers may be represented by formula (III)

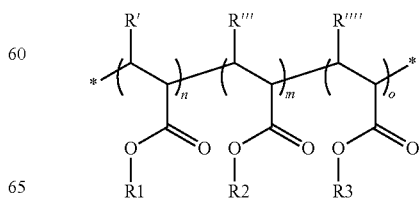

With R1=fluorinated Group
R2=functional Group
R3=non functional Group
n, m, o=total number of respective monomers
R'=H, CH$_3$ The functional co-monomer is preferably selected from monomers comprising OH, epoxy, —Si(OMe)$_3$, —Si(OEt)$_3$, CO$_2$H or tertiary amino groups. Especially preferred functional co-monomers are selected from the following monomers, wherein R'''=H or methyl:

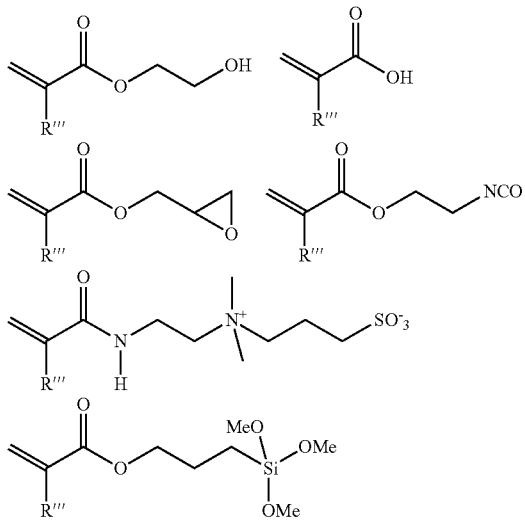

The non-functional co-monomer is preferably selected from monomers comprising linear or branched alkyl groups or polyether groups or from styrene like monomers. Especially preferred non-functional co-monomers are selected from the following monomers, wherein R''''=H or methyl:

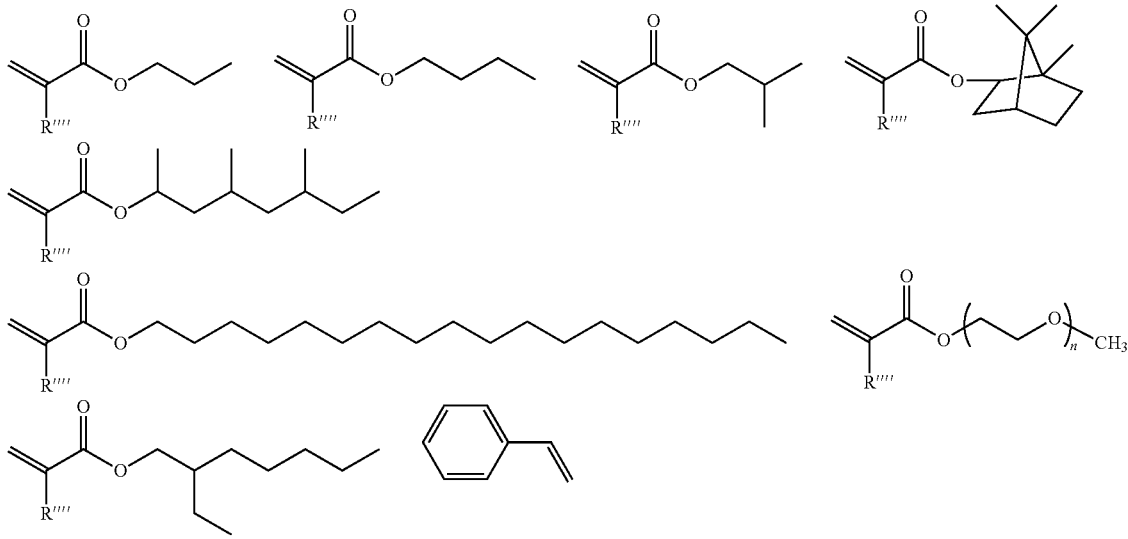

In a preferred variant of the invention, the polymers comprise monomer units derived from at least one monomer of formulae (I) and/or (II), at least one functional co-monomer, and at least one non-functional co-monomer.

The polymer may comprise the three types of monomer (fluorinated group: Rf-G, functional group: F-G and non-functional group: nF-G) in every ration between 1-99% yielding a total of 100% in the final polymer %=weight %). Preferred combinations are

TABLE 1

| | | |
|---|---|---|
| Rf-G | 20-80% | 50-98% |
| F-G | 2-20% | 2-50% |
| nF-G | 20-80% | 0% |
| total | 100% | 100% |

Balancing the composition of the co-polymer is key to the end performance of the polymer in the final composition or coating.

The polymerisation itself can be accomplished by standard processes, i.e. by radical polymerisation in solution, in bulk or in emulsion. Suitable initiators are for example azobis(isobutyronitrile) (AIBN) and 2-2'-azobis(2,4-dimethylvaleronitrile) (Vazo 52®). Suitable solvents are for example isopropyl acetate, 1,4-dioxane, tetrahydrofuran and toluene.

Polymerisation processes are known to the person skilled in the art. Conventional process parameters are shown by way of example in the experimental part. The polymer may be isolated or used in dispersion or solution. Preferably, the polymerisation is carried out in the same solvents as the later coating dispersion are used. If the solvent is not suitable, a solvent exchange after polymerisation can be carried out. Preferably the polymerisation is carried out as a free radical polymerization under inert atmosphere with a thermally activated initiator like AIBN.

The polymers according to the invention may be used as such as coating materials or as additives for conventional coatings.

The polymers according to the invention comprising compounds of formulae (I) and/or (II), preferably of formulae (Ia) to (Ic) and/or (IIa) to (IIc), in particular in their preferred variants, may have improved environmental properties compared with polymers of the prior art, since they do not degrade either chemically or biologically to form long-chain PFCAs or PFASs.

Preferred areas of use are, for example, the use of the polymers according to the invention as additives in preparations for surface coating, such as paints, lacquers, protective coatings, special coatings in electronic or semi-conductor applications (for example photoresists, top antireflective coatings, bottom antireflective coatings) or in optical applications (for example photographic coatings, coatings of optical elements), in agrochemicals, in polishes and waxes, for example for furniture, floorcoverings and automobiles, in particular in floor polishes, in fire-extinguishing compositions, lubricants, or in photolithographic processes, in particular in immersion photolithography processes, for example in developer solutions, rinse solutions, immersion oils and/or in the photoresists themselves, especially for the production of printed circuits or in additive preparations for corresponding preparations.

For use, the polymers according to the invention are usually introduced into correspondingly designed preparations. Usual use concentrations are 0.01-30.0%, preferably 0.01-10.0% by weight of the polymer according to the invention, based on the entire compositions. The present invention likewise relates to corresponding compositions comprising the polymers according to the invention. Such compositions preferably comprise a solvent which is suitable for the respective application, and optionally further active sub-stances and/or optionally additives. Preferred compositions are paint and coating preparations, fire-extinguishing agents, lubricants, washing agents and detergents and de-icers or developer solutions, rinse solutions, immersion oils and photoresists for photolithographic processes, in particular for immersion photolithography processes and in particular for the production of printed circuits, agrochemicals, floor polishes, cosmetic products, cosmetic products or hydrophobicisation agents for textile finishing or glass treatment. Preferred compositions here are paint and coating preparations and printing inks.

In addition, the present invention also relates to water-based surface-coating formulations which comprise the polymers according to the invention, alone or mixed with additives. Preference is given to the use of surface-coating formulations based on the following synthetic film formers: polycondensation resins, such as alkyd resins, saturated/unsaturated polyesters, polyamides/imides, silicone resins; phenolic resins; urea resins and melamine resins, polyaddition resins, such as polyurethanes and epoxy resins, polymerisation resins, such as polyolefins, polyvinyl compounds and polyacrylates.

In addition, the polymers according to the invention are also suitable for use in surface coatings based on natural products and modified natural products. Preference is given to surface coatings based on oils, polysaccharides, such as starch and cellulose, and also based on natural resins, such as cyclic oligoterpenes, polyterpenes and/or shellac.

The polymers according to the invention can be used both in physically hardening (thermoplastics) and in crosslinking (elastomers and thermosets) aqueous surface-coating systems. The polymers according to the invention preferably improve the water and/or dirt repellency of the coated surfaces.

The present invention relates to all uses mentioned here of polymers to be employed in accordance with the invention. The respective use of polymers for the said purposes is known to the person skilled in the art, and consequently the use of the polymers to be employed in accordance with the invention presents no problems.

The present invention particularly relates to the use of the polymers according to the invention and their preferred embodiments described above as and in functional coatings, for example for improving the water and/or dirt repellency of coating formulations, e.g. epoxy, acrylic, and PUR coatings.

Besides the polymers comprising monomers units of compounds of formulae (I) and/or (II), coating formulations according to the invention may also comprise solvents, additives, assistants, and fillers as well as non-fluorinated polymers.

A solution or dispersion comprising one or more polymers according to the invention can be applied as an additive for conventional coatings, but it also can be beneficial to spin coat the solution or dispersion itself as a thin layer on a substrate. Suitable substrates are for example glass, ceramics, metals, textiles, garment or leather.

The polymers and coatings comprising such polymers may be beneficial in terms of their eco toxicological profile and at the same time show good water and dirt repellency. Furthermore, polymers and coatings according to the invention may show good processability and/or storage stability.

The complete disclosure contents of all applications and publications mentioned expressly also belong to the disclosure content of the present application by way of reference. Further features, advantages and variants of the invention also arise from the claims and examples. The following examples explain the present invention in greater detail without restricting the scope of protection.

EXAMPLES

Abbreviations

MTBE tert-butyl methyl ether

DI water deionised water

RT room temperature wt weight percent

Figure 1:
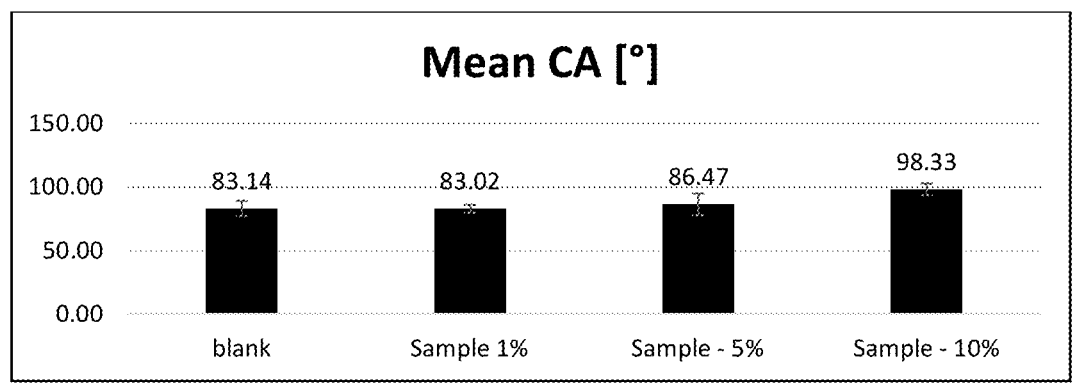
FIG. 1 shows the results of a contact angle measurement of a water droplet on 2K-PUR coating with and without polymer additive.

Example 1: Synthesis of 2-Methyl-acrylic acid 2-(1,1,2-trifluoro-2-heptafluoropropyloxy-ethylsulfanyl)-ethyl ester

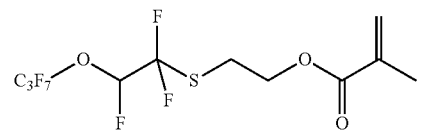

Example 1a

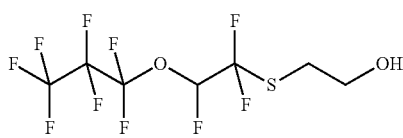

77.30 g of perfluoropropyl vinyl ether, 52.21 g of 2-mercaptoethanol, 40 ml acetonitrile, and 12 g of potassium carbonate are heated to 100° C. in a pressure reactor for 18 h. 25 ml water and 25 ml MTBE are added to the reaction mixture and the phases are separated. The aqueous phase is extracted with 2×25 mL MTBE and the combined organic phases are washed with 70 mL water and 70 mL saturated NaCl solution. The extract is dried over sodium sulfate, the solvent is removed and the raw material is distilled (b.p. 45-49° C. at 0.1 mbar). product: 63.40 g=63%

1H-NMR: 6.8 ppm (dt, 1H, —CFH); 3.6 ppm (t, 2H, —CH2O—); 3.1 ppm (t, 2H, —SCH2);

Example 1 b

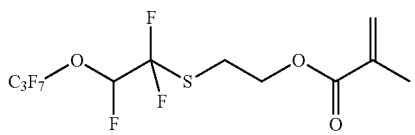

10 g of the alcohol from example 1b are dissolved in 60 ml toluene together with 0.5 g of toluene-4-sulfonic acid monohydrate. 4.5 g of methacrylic acid anhydride are then slowly added under agitation and the reaction mixture is stirred for 24 h at 110° C. The mixture is cooled to RT, 25 mL water and 25 mL MTBE are added and the phases are separated. Subsequently, the aqueous phase is washed with 2×25 mL MTBE. The combined organic phases are dried over sodium sulfate, filtered and the solvent is distilled off in a rotary evaporator.

product: 11.30 g=94%

1H-NMR: 7.1 ppm (m, 1H, —CFH); 6.1 ppm (m, 1H, =CH); 5.7 ppm (m, 1H, =CH); 4.3 ppm (t, 2H, —CH2O—); 3.2 ppm (t, 2H, —SCH2); 1.9 ppm (s, 3H, —CH3)

Example 2: Synthesis of 2-Methyl-acrylic acid 2-(1,1,2-trifluoro-2-heptafluoropropyloxy-ethoxy)-ethyl ester

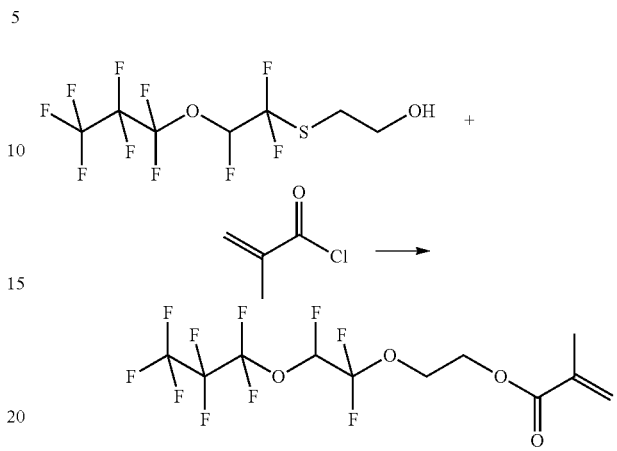

41.4 g (126.2 mmol) 2-(1,1,2-trifluoro-2-heptafluoropropyloxy-ethoxy)-ethanol, (0.1 eq.) TEMPO, and 16.6 g (164 mmol, 1.3 eq.) triethylamine are initially introduced under argon in a three-neck round bottom flask with 220 mL MTBE and cooled to 0° C. with ice-cooling. 14.5 g (138 mmol, 1.3 eq.) methacrylic acid chloride are added dropwise. The mixture is stirred under ice-cooling overnight and then stirred at reflux for 18 h. The product is purified by solvent extraction with water and MTBE. The phases are separated and the aqueous phase is extracted twice with 75 ml MTBE. The combined organic phases are washed with 100 mL of water and 100 mL saturated NaCl solution, dried over sodium sulfate and the solvent is removed in vacuo.

product: 53 g

1H-NMR (DMSO, 60 MHz):

| | |
|---|---|
| CHF | 6.8-7.5 ppm (dt) |
| OCH2 | 3.62 ppm (t) |
| CH2CH2O | 4.2 ppm (t) |
| CCH3 | 1.83 ppm (s) |
| CCH2 | 5.7-6.1 ppm (dd)fv |

Example 3: Synthesis of 2-Methyl-acrylic acid 2-{3-[2,3-bis-(1,1,2-trifluoro-2-heptafluoropropyloxy-ethoxy)-propoxy]-propylsulfanyl}-ethyl ester

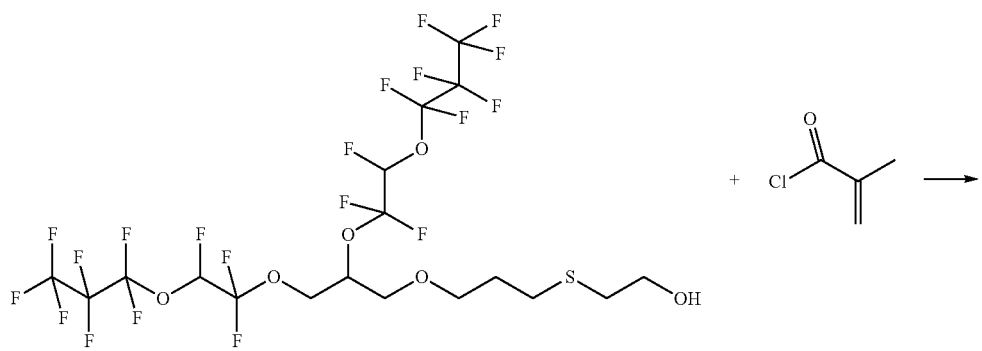

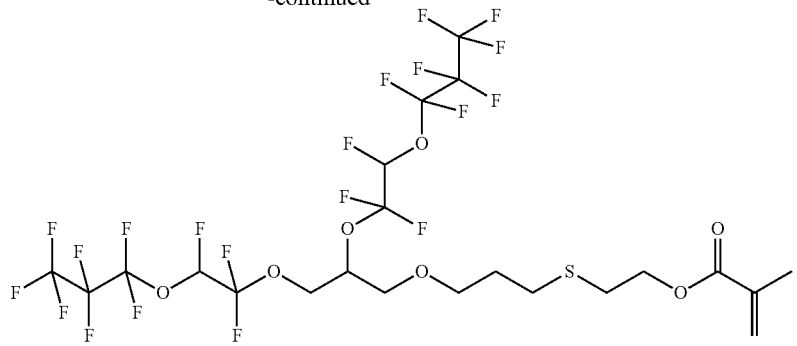

4.7 g (6.3 mmol) 2-{3-[2,3-bis-(1,1,2-trifluoro-2-heptafluoropropyloxy-ethoxy)-propoxy]-propylsulfanyl}-ethanol and 0.84 g (8.3 mmol, 1.3 eq.) triethylamine are initially introduced under argon in a three-neck round bottom flask with 30 mL MTBE and cooled to 0° C. with ice-cooling. 1.2 g (11.4 mmol, 1.8 eq.)

methacrylic acid chloride are added dropwise. The mixture is stirred under ice-cooling overnight and then stirred at reflux for 18 h. The product is purified by solvent extraction with water and MTBE. The phases are separated and the aqueous phase is extracted twice with 75 ml MTBE. The combined organic phases are washed with 100 mL of water and 100 mL saturated NaCl solution, dried over sodium sulfate and the solvent is removed in vacuo. product: 5.1 g 1H-NMR (DMSO, 60 MHz):

|   |   |
|---|---|
| CHF | 6.8-7.5 ppm (dt) |
| OCH2CH | 3.9 ppm (d) |
| CHCH2O | 3.9 ppm (d) |
| CH2CHCH2 | 4.9 ppm (tt) |
| OCH2CH2 | 4.2 ppm (t) |
| CH2CH2S | 2.2 ppm (tt) |
| CH2CH2S | 3.8 ppm (t) |
| SCH2 | 3.4 ppm (t) |
| CH2CH2O | 4.3 ppm (t) |
| CCH3 | 1.83 ppm (s) |
| CCH2 | 5.7-6.1 ppm (dd) |

Example 4: Synthesis of 2-Methyl-acrylic acid 2,3-bis-(1,1,2-trifluoro-2-heptafluoropropyloxy-ethoxy)-propyl ester

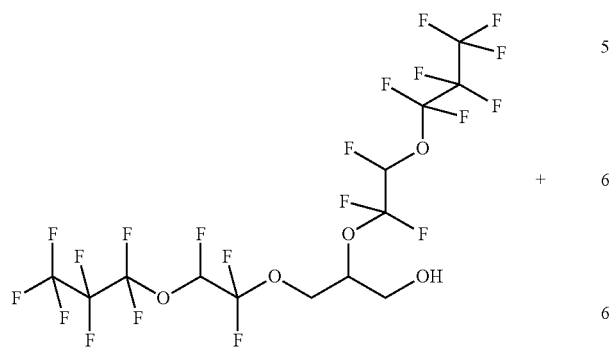

+

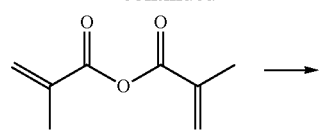

→

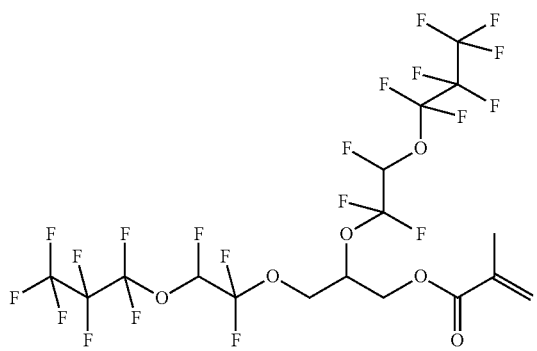

10 g (16 mmol) 2,3-bis-(1,1,2-trifluoro-2-heptafluoropropyloxy-ethoxy)-propan-1-ol and 0.55 g (3 mmol, 0.2 eq.) 4-methylbenzenesulfonic acid monohydrate are initially introduced in 35 mL toluene. 2.72 g (18 mmol, 1.1 eq.) methacrylic acid anhydride are added dropwise. The mixture is stirred at reflux for 24 h. 25 mL water and 25 mL MTBE are added to the reaction mixture and the phases are separated. The aqueous phase is washed twice with 25 ml MTBE. The combined organic phase is washed with 25 mL water, dried over sodium sulfate and filtered. The solvent is removed in vacuo. product: 9.9 g 1H-NMR (DMSO, 60 MHz):

|   |   |
|---|---|
| CHF | 6.8-7.5 ppm (dt) |
| OCH2CH | 4.2 ppm (d) |
| CH2CHCH2 | 4.8 ppm (tt) |
| CHCH2O | 4.2 ppm (d) |
| CCH3 | 1.83 ppm (s) |
| CCH2 | 5.7-6.1 ppm (dd) |

Example 5: Synthesis of Acrylic acid 2-(1,1,2-trifluoro-2-heptafluoropropyloxy-ethylsulfanyl)-ethyl ester

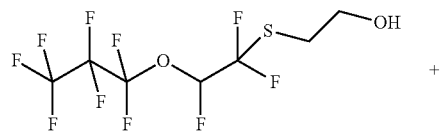

1H-NMR (DMSO, 60 MHz):

| | |
|---|---|
| CHF | 6.8-7.5 ppm (dt) |
| SCH2 | 2.78 ppm (t) |
| CH2CH2O | 4.1 ppm (t) |
| CHCH2 | 6.2 ppm (s) |
| CHCH2 | 5.9-6.1 ppm (dd |

Example 6: Synthesis of Acrylic acid 2-{3-[2,3-bis-(1,1,2-trifluoro-2-heptafluoropropyloxy-ethoxy)-propoxy]-propylsulfanyl}-ethyl ester

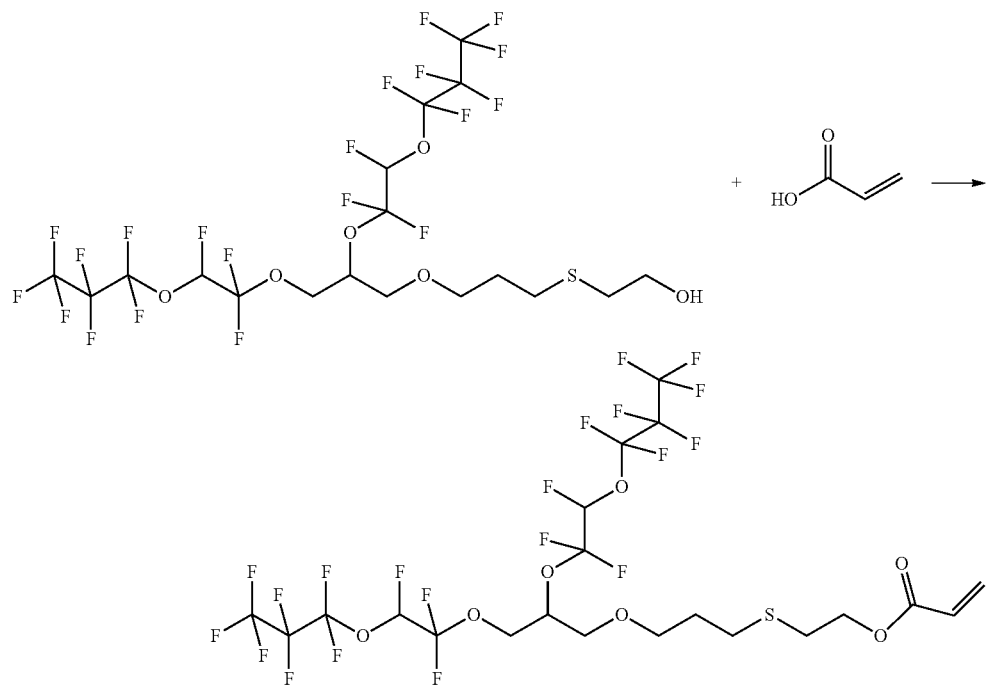

-continued

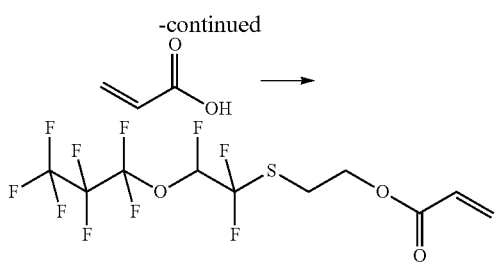

50.0 g (145 mmol) 2-(1,1,2-trifluoro-2-heptafluoropropyloxy-ethylsulfanyl)-ethanol, 12.1 g (168 mmol, 1.15 eq.) acrylic acid, and 4.5 g (0.2 eq.) 4-methylbenzenesulfonic acid monohydrate are introduced in 300 mL toluene. and stirred at reflux for 24 h.

The product is purified by solvent extraction with water and MTBE.

The phases are separated and the aqueous phase is extracted twice with 75 ml MTBE. The combined organic phases are washed with 100 mL of water and 100 mL saturated NaCl solution, dried over sodium sulfate and the solvent is removed in vacuo. product: 36.9 g 10.7 g (14 mmol) 2-{3-[2,3-bis-(1,1,2-trifluoro-2-heptafluoropropyloxy-ethoxy)-propoxy]-propylsulfanyl}-ethanol, 1.09 g (15 mmol, 1.15 eq.) acrylic acid, and 0.6 g (0.22 eq.) 4-methylbenzenesulfonic acid monohydrate are introduced in 30 mL toluene. and stirred at reflux for 24 h.

The product is purified by solvent extraction with water and MTBE.

The phases are separated and the aqueous phase is extracted twice with 75 ml MTBE. The combined organic phases are washed with 100 mL of water and 100 mL saturated NaCl solution, dried over sodium sulfate and the solvent is removed in vacuo. product: 5.4 g 1H-NMR (DMSO, 60 MHz):

| | |
|---|---|
| CHF | 6.8-7.5 ppm (dt) |
| OCH2CH | 3.9 ppm (d) |
| CHCH2O | 3.9 ppm (d) |
| CH2CHCH2 | 4.9 ppm (tt) |
| OCH2CH2 | 4.2 ppm (t) |
| CH2CH2S | 2.2 ppm (tt) |
| CH2CH2S | 3.8 ppm (t) |

-continued

| | |
|---|---|
| SCH2 | 3.4 ppm (t) |
| CH2CH2O | 4.3 ppm (t) |
| CHCH2 | 6.2 ppm (s) |
| CHCH2 | 5.7-6.1 ppm (dd) |

Example 7: General Procedure A for Copolymerization

A 50 ml three neck glass round-bottomed flask equipped with a gas inlet, condenser and septum, is charged with 19.35 g of a monomer and solvent premix. An inert atmosphere is created by alternating vacuum and the entry of nitrogen.

In a vial 0.04 g Vazo™ 52 (Chemour) in 0.4 g isopropyl acetate is added via a syringe under inert atmosphere through the septum and the mixture is heated up to 60° C. for 24 h.

Additionally 0.01 Vazo™ 52 n 0.2 g isopropyl acetate is added and the mixture is stirred for additional 12 h at 60° C. under inert atmosphere.

The solvent is removed via distillation.

Example 7a

In order to improve the handling a 20 g premix of the following material is made:
2.16 g of 2-Methyl-acrylic acid 2-(1,1,2-trifluoro-2-heptafluoropropyloxy-ethylsulfanyl)-ethyl ester
2.16 g of n-Butylmethacrylate
0.48 g of 2,3-Epoxypropyl methacrylate
14.55 g Isopropyl Acetate

Example 7b 20 g premix of the following material is made:
2.32 g of 2-Methyl-acrylic acid 2-(1,1,2-trifluoro-2-heptafluoropropyloxy-ethylsulfanyl)-ethyl ester
2.16 g of n-Butylmethacrylate
0.48 g of 2-Hydroxyethylmethacrylat
14.39 g Isopropyl Acetate

Example 7c 20 g premix of the following material is made:
2.16 g of 2-Methyl-acrylic acid 2-(1,1,2-trifluoro-2-heptafluoropropyloxy-ethylsulfanyl)-ethyl ester
2.16 g of n-Butylmethacrylate
0.48 g of Methacryloxypropyltrimethoxysilane
14.39 g Isopropyl Acetate

Example 8: Application Tests

The repellency effect of the polymers is tested in the corresponding coating systems at different concentrations or as diluted solution without resin (glass coating) by contact angle measurement. The apparatus used is a drop shape analyzer (DSA100 from Kruess, Germany), the test liquid is DI water.

Example 8a

TABLE 2

2K PUR coating formulation

| Number | Compound | Amount (g) | Producer |
|---|---|---|---|
| Base coat | | | |
| 1 | Desmophen A 870 BA | 51.15 | CSC Jäkle (Bayer) |
| 2 | Baysilone OL 17; 10% in Xylene | 0.53 | OMG Borchers |
| 3 | Xylene | 16.00 | Merck |
| 4 & 5 | Methoxypropylacetate/ Solventnaphtha 1:1 | 10.17 | Merck/DHC Chemie |
| 6 | Butylglykolacetate | 2.13 | Merck |
| Hardener | | | |
| 7 | Desmodur N 3390 BA/SN | 19.49 | CSC Jäkle (Bayer) |

Preparation Base Coat:

In a 250 ml flask component 1-6 is added and mixed with a magnetic stirrer for 12 h.

With the base coat, hardener and polymer from example 9b the following mixtures are prepared:

TABLE 3

| | Blank | 1% | 5% | 10% |
|---|---|---|---|---|
| Base coat | 8.00 g | 7.75 g | 4.00 g | |
| Polymer from example 7b in 50 w % Butylacetate | — | 0.25 g | 0.55 g | 1.30 g |
| Hardener | 2.00 g | 2.00 g | 0.91 g | 1.06 g |

The components are mixed with a magnetic stirrer for 45 min.

For the coating application the following equipment is used:
byko-chart/Opacity Chart (byk-Gardner GmbH AG-5305) Black/White Drawdown chart
Doctor blade (Erichsen, Model 360, 30 μm)
automatic film applicator (byk-Gardner GmbH)
vacuum oven Preparation Coating:

The lacquer is applied with a wet film thickness of 30 μm
The charts is allowed to level for 15 mins
Curing conditions 30 min @130° C. and 250 mbar.

Results of Example 8a:

FIG. 1 shows the results of a contact angle measurement of a water droplet on 2K-PUR coating with and without polymer additive. The measurement is repeated five times on different areas of the coated substrate. From these five measurements the mean value (height of the black bar) and the averaged deviation (bracket on top of the black bar) is evaluated. The blank measurement shows the contact angle (water repellence) of the pure coating, the sample measurement reveal the improvement of repellence due to the presence of the fluorinated additive at 1%, 5% and 10%. The contact angle increases from 83.14° to 98.33°

Example 8b

TABLE 4

| | Epoxy coating formulation | |
|---|---|---|
| Number | Compound | Producer |
| Base coat | | |
| 1 | Benzylalcohol | VWR |
| 2 | Glycidyl-4-nonylphenylether | Sigma Aldrich |
| 3 | Butylacetate | VWR |
| 4 | Polymer example 7a 50% in Butylacetate | |
| 5 | Bisphenol A diglycidylether | Sigma Aldrich |
| Hardener | | |
| 6 | Isophorondiamin | Sigma Aldrich |

Preparation Base Coat:

Components 1-4 are mixed with a spatula. Compound 5 is heated to 40° C. for 1 h before using. Then the epoxide 5 is added to 1-4 and mixed in a Speedmixer at 2800 UPM for 2 min. The hardener 6 is added and mixed with a Speedmixer at 2800 UPM for 30 sec.

TABLE 5

| Compound | blank | 1% | 2% | 10% |
|---|---|---|---|---|
| 1 | 2.25 g | 2.00 g | 2.00 g | 0.70 g |
| 2 | 0.13 g | 0 | 0 | 0 |
| 3 | 0.13 g | 0 | 0 | 0 |
| 4 | — | 0.20 g | 0.40 g | 0.90 g |
| 5 | 7.50 g | 6.67 g | 6.67 g | 2.33 g |
| | 2.25 g | 2.00 g | 2.00 g | 0.70 g |

For the coating application the following equipment is used:

Small aluminium bowl 5x5x0.5 cm

Ventilation oven

Preparation Coating:

The resin is poured into the aluminum bowl

The charts is allowed to level for 60 mins

Curing conditions 60 min @100° C.

Figure 2:
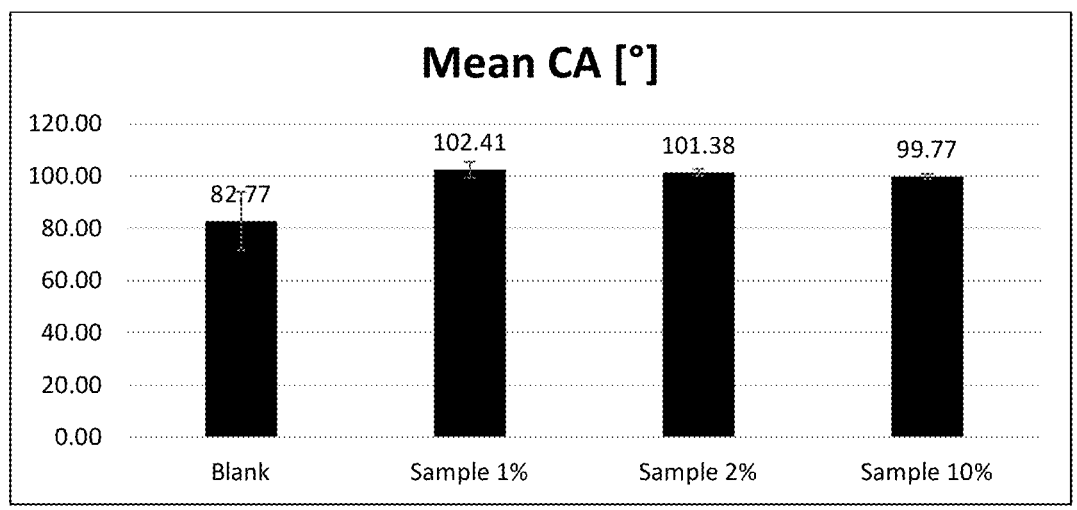
FIG. 2 shows the results of a contact angle measurement of a water droplet on epoxy coating with and without polymer additive.

Results of Example 8b:

FIG. 2 shows the results of a contact angle measurement of a water droplet on epoxy coating with and without polymer additive. The measurement is repeated five times on different areas of the coated substrate. From these five measurements the mean value (height of the black bar) and the averaged deviation (bracket on top of the black bar) is evaluated.

The blank measurement shows the contact angle (water repellence) of the pure coating, the sample measurement reveal the improvement of repellence due to the presence of the fluorinated additive at 1%, 5% and 10%. The contact angle increases from 82.77° to 102.41° with a polymer addition of as little 1%. More additive does not improve the repellence any further (101.38° and 99.77° for 2% and 10% resp.)

Example 8c

Glass Coating of a Diluted Solution without Resin:

The polymer residue of example 7c is diluted with n-butyl acetate to yield a 0.5 wt % dispersion.

Preparation Coating:

After filtering through a 50 µm Filter the material is applied on a glass substrate (cleaned with acetone). The solvent is allowed to dry at room temperature for 45 min and is additionally cured at 100° C. for 60 min.

Figure 3:
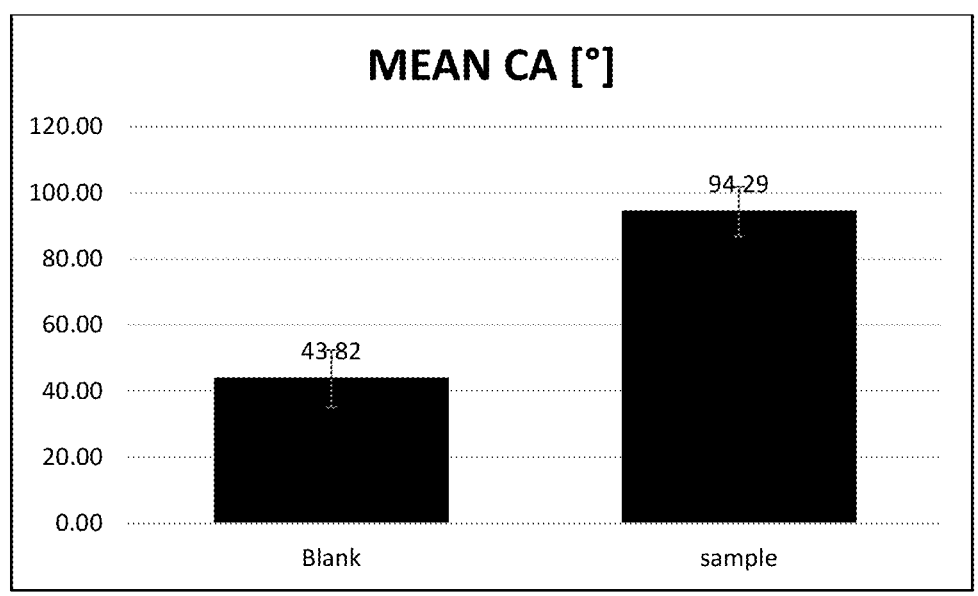
FIG. 3 shows the results of a contact angle measurement of a water droplet on cleaned glass slide with and without polymer additive.

Results of Example 8c:

FIG. 3 shows the results of a contact angle measurement of a water droplet on cleaned glass slide with and without polymer additive. The measurement is repeated five times on different areas of the coated substrate. From these five measurements the mean value (height of the black bar) and the averaged deviation (bracket on top of the black bar) is evaluated.

The blank measurement shows the contact angle (water repellence) of the pure glass, the sample measurement reveal the improvement of repellence due to the presence of the fluorinated additive (since the polymer is applied without additional coating system the material can be seen as 100% additive). The contact angle increases from 43.82° to 94.29°.

Example 9: General Procedure B for Copolymerization

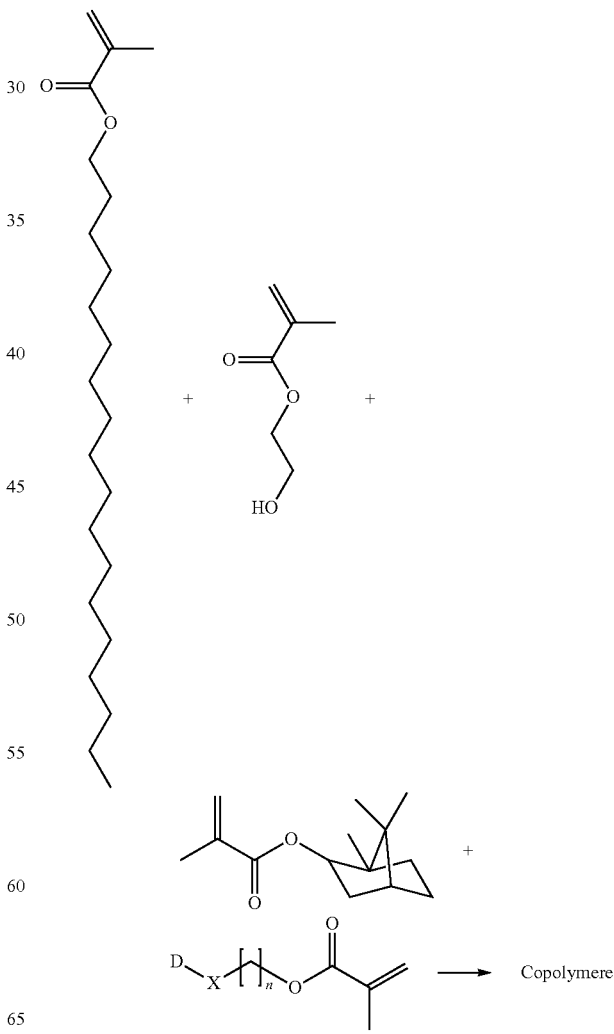

The monomers (62.50 wt % Fluoro-MA, 20.83 wt % stearyl methacrylate, 2.08 wt % 2-hydroxymethyl methacrylate, 12.50 wt % isobornyl methacrylate) and isopropyl acetate are initially introduced into a dry three neck round-bottomed flask. An inert atmosphere is created by alternating vacuum and the entry of argon. Corresponding to 0.2 wt % of the total composition, a solution of Vazo™ 52 in isopropyl acetate (50 wt %) is added dropwise. The composition is heated and stirred overnight. Additionally, corresponding to 0.1 wt % of the total composition, a solution of Vazo™ 52 in isopropyl acetate (5 wt %) is added dropwise and the composition is again heated and stirred overnight. Subsequently, the solvent is removed in vacuo.

Example 10: Homopolymerization

Example 10a

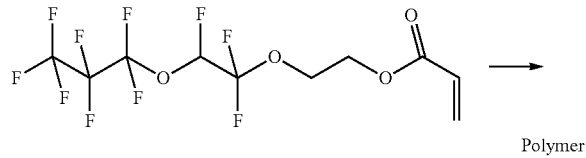

Polymer

Acrylic acid 2-(1,1,2-trifluoro-2-heptafluoropropyloxy-ethoxy)-ethyl ester in isopropyl acetate is introduced into a dry three neck round-bottomed flask and an inert atmosphere is created by alternating vacuum and the entry of argon. Corresponding to 0.2 wt % of the total composition, a solution of Vazo™ 52 in isopropyl acetate (50 wt %) is added dropwise. The composition is heated and stirred overnight. Additionally, corresponding to 0.1 wt % of the total composition, a solution of Vazo™ 52 in isopropyl acetate (5 wt %) is added dropwise and the composition is again heated and stirred overnight. Subsequently, the solvent is removed in vacuo.

Example 10b

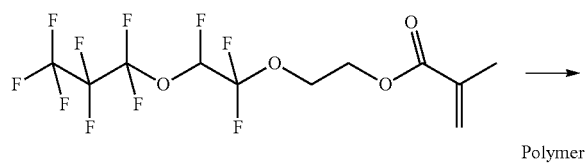

Polymer

Methacrylic acid 2-(1,1,2-trifluoro-2-heptafluoropropyloxy-ethoxy)-ethyl ester in isopropyl acetate is introduced into a dry three neck round-bottomed flask and an inert atmosphere is created by alternating vacuum and the entry of argon. Corresponding to 0.2 wt % of the total composition, a solution of Vazo™ 52 in isopropyl acetate (50 wt %) is added dropwise. The composition is heated and stirred overnight. Additionally, corresponding to 0.1 wt % of the total composition, a solution of Vazo™ 52 in isopropyl acetate (5 wt %) is added dropwise and the composition is again heated and stirred overnight. Subsequently, the solvent is removed in vacuo.

Example 10c

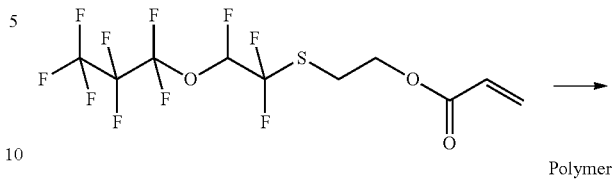

Polymer

Acrylic acid 2-(1,1,2-trifluoro-2-heptafluoropropyloxy-ethylsulfanyl)-ethyl ester in isopropyl acetate is introduced into a dry three neck round-bottomed flask and an inert atmosphere is created by alternating vacuum and the entry of argon. Corresponding to 0.2 wt % of the total composition, a solution of Vazo™ 52 in isopropyl acetate (50 wt %) is added dropwise. The composition is heated and stirred overnight. Additionally, corresponding to 0.1 wt % of the total composition, a solution of Vazo™ 52 in isopropyl acetate (5 wt %) is added dropwise and the composition is again heated and stirred overnight. Subsequently, the solvent is removed in vacuo.

Example 11: Oil-Repellency Test

The Oil-Repellency test is a method to evaluate the oil and water repellent effect (DWR-effect) of polymers on fabrics. Based on the AATCC Test Method 118-2013, drops of standards test solvents of varying surface tensions are placed on a surface treated with polymers. The fabrics (cotton and polyester) are previously laid in the DWR solution and dried. Parameters like size of fabric, solution volume, solution concentration, and drying time are repeatable and identical conditions. Table 6 shows test solvents and repellency grades. The oil repellency Grade is the highest numbered test liquid which will not wet the fabric surface. This non-wetting criterion has to be hold within a period of 30 s. A grade zero is assigned when the fabric fails the mineral oil test liquid.

Grading example (pattern AATCC Test Method 118-2013): A=Passes; clear well-rounded drop B=Borderline pass; rounding drop with partial darkening C=Fails; wicking apparent and/or complete wetting D=complete wetting

TABLE 6

| | Specified | |
|---|---|---|
| Oil Repellency Grad | Composition/Solvent | Surface Tension (25° C.) (dynes/cm) |
| 0 | None (fail Kaydol) | — |
| 1 | Kaydol | 31.5 |
| 2 | Kaydol:n-hexadecane (65:35) | — |
| 3 | n-hexadecane | 27.3 |
| 4 | n-tetradecane | 26.4 |
| 5 | n-dodecane | 24.7 |
| 6 | n-decane | 23.5 |
| 7 | n-octane | 21.4 |
| 8 | n-heptane | 19.8 |

Requirements of Oil Repellency Textiles, No. FTTS-FA-01 [online] Available on: [http://www.ftts.org.tw/images/fa012E.pdf] [Consulted on 6 Aug. 2016]

TABLE 7

Test Results

| Fluoro-MA | Formulation | Viscosity | Oil-Repellency |
|---|---|---|---|
| 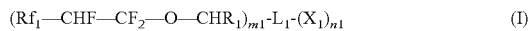 | C6 Standard Formulation | — | cotton: 6<br>polyester: 6 |
| 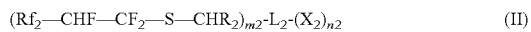 | C8 Standard Formulation | — | cotton: 6<br>polyester: 6 |
| 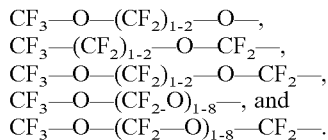 | 100% Fluor-MA | Very viscous | cotton: 6<br>polyester: 5 |
| | Standard Formulation | <C6-C8-Material | cotton: 5<br>polyester: — |
| | 45% linear Fluoro-MA<br>45% HEMA<br>10% butyl acrylate | Very viscous | cotton: 5<br>polyester: 5 |
| 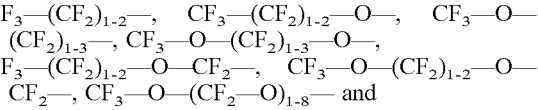 | 100% Fluor-MA | viscous | cotton: 5<br>polyester: 4 |

The invention claimed is:

1. A polymer comprising monomer units derived from at least one monomer of formulae (I) or (II)

$$(Rf_1—CHF—CF_2—O—CHR_1)_{m1}\text{-}L_1\text{-}(X_1)_{n1} \quad (I)$$

$$(Rf_2—CHF—CF_2—S—CHR_2)_{m2}\text{-}L_2\text{-}(X_2)_{n2} \quad (II)$$

wherein
 $Rf_1$ and $Rf_2$ are each, independently of one another, a perfluorinated alkyl group which optionally contains heteroatoms,
 $R_1$ and $R_2$ are each, independently of one another, H or an alkyl group,
 $L_1$ and $L_2$ are each, independently of one another, a single bond or a bivalent organic group,
 $X_1$ and $X_2$ are each, independently of one another, an acrylate or methacrylate group,
 $m_1$ and $m_2$ are each, independently of one another, $\geq 1$, and
 $n_1$ and $n_2$ are each, independently of one another, $\geq 1$.

2. The polymer according to claim 1, wherein $Rf_1$ and $Rf_2$ are each, independently of one another, selected from the groups
 $CF_3—(CF_2)_{0-3}—$, $CF_3—(CF_2)_{0-3}—O—$,
 $CF_3—(CF_2)_{0-3}—O—(CF_2)_{1-3}—$,
 $CF_3—(CF_2)_{0-3}—O—(CF_2)_{1-3}—O—$,
 $CF_3—(CF_2)_{0-3}—O—(CF_2)_{1-3}—O—CF_2—$,
 $CF_3—(CF_2)_{0-3}—O—(CF_2—O)_{1-8}—$, and
 $CF_3—(CF_2)_{0-3}—O—(CF_2—O)_{1-8}—CF_2—$.

3. The polymer according to claim 1, wherein $Rf_1$ and $Rf_2$ are each, independently of one another, selected from the groups
 $CF_3—(CF_2)_{1-2}—$, $CF_3—(CF_2)_{1-2}—O—$,
 $CF_3—O—(CF_2)_{1-3}—$,
 $CF_3—O—(CF_2)_{1-2}—O—$,
 $CF_3—(CF_2)_{1-2}—O—CF_2—$,
 $CF_3—O—(CF_2)_{1-2}—O—CF_2—$,
 $CF_3—O—(CF_2—O)_{1-8}—$, and
 $CF_3—O—(CF_2—O)_{1-8}—CF_2—$.

4. The polymer according to claim 1, wherein $R_1$ and $R_2$ are each, independently of one another, selected from H or C1-C3 alkyl.

5. The polymer according to claim 1, wherein $L_1$ and $L_2$ are each, independently of one another, selected from a single bond and a saturated, branched or not branched alkylene group that optionally contains heteroatoms and/or functional groups.

6. The polymer according to claim 1, wherein $m_1$ and $m_2$ are each, independently of one another, equal to 1-3.

7. The polymer according to claim 1, wherein $n_1$ and $n_2$ are each, independently of one another, equal to 1-3.

8. The polymer according to claim 1, wherein $Rf_1$ and $Rf_2$ are each, independently of one another, selected from
 $CF_3—(CF_2)_{1-2}—$, $CF_3—(CF_2)_{1-2}—O—$, $CF_3—O—(CF_2)_{1-3}—$, $CF_3—O—(CF_2)_{1-3}—O—$,
 $CF_3—(CF_2)_{1-2}—O—CF_2—$, $CF_3—O—(CF_2)_{1-2}—O—CF_2—$, $CF_3—O—(CF_2—O)_{1-8}—$ and
 $CF_3—O—(CF_2—O)_{1-8}—CF_2—$,
 $R_1$ and $R_2$ are each, independently of one another, H or $CH_3$,
 $L_1$ and $L_2$ are each, independently of one another, a single bond or a C1-C4 alkylene group, optionally branched, and optionally containing hetero atoms and/or a functional group,
 $m_1$ and $m_2$ are each, independently of one another, equal to 1 or 2, and
 $n_1$ and $n_2$ are each, independently of one another, equal to 1.

9. The polymer according to claim 1, wherein the monomer is selected from formulae (Ia), (Ib), (Ic), (IIa), (IIb), and (IIc):

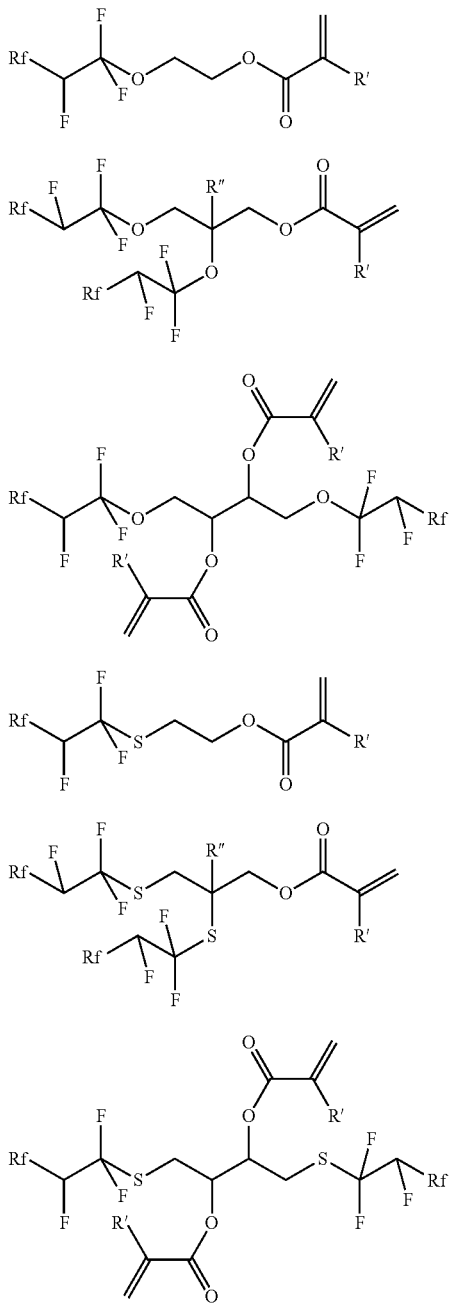

wherein
Rf is a perfluorinated alkyl group optionally containing heteroatoms, and
R' and R" are each, independently of one another, H or an alkyl group.

10. The polymer according to claim 9, wherein Rf is $CF_3-CF_2-CF_2-O-$, $CF_3-CF_2-O-$ or $CF_3-O-$ and R' and R" are each, independently of one another, H or methyl.

11. The polymer according to claim 1, wherein the polymer comprises at least one functional and/or non-functional co-monomer.

12. The polymer according to claim 1, wherein the polymer comprises at least one functional co-monomer selected from co-monomers comprising OH, epoxy, —Si(OMe)$_3$, —Si(OEt)$_3$, CO$_2$H or tertiary amino groups, wherein Me is methyl and Et is ethyl.

13. The polymer according to claim 1, wherein the polymer comprises at least one non-functional monomer selected from co-monomers comprising linear or branched alkyl groups or polyether groups or from styrene like monomers.

14. A method for the production of functional coatings and/or surface modifications, applying a coating or surface modification containing at least one polymer according to claim 1.

15. A method for treating a substrate comprising:
contacting a substrate with a composition comprising at least one polymer according to claim 1, optionally a film forming binder, optionally a solvent, and optionally an additive, and
drying said composition on said substrate.

16. A coated substrate formed according to the method of claim 15.

17. A paint, coating, printing ink, protective coating, special coating for in electronic or optical applications, photoresist, top antireflective coating, bottom antireflective coating, cosmetic product, agrochemical, floor polish, photographic coating, or coating for optical elements, comprising: a polymer according to claim 1.

18. A composition comprising at least one polymer according to claim 1, optionally a film forming binder, optionally a solvent, and optionally an additive.

19. A composition according to claim 18, wherein said composition is a paint composition, a coating composition, a fire-extinguishing composition, a lubricant, a de-icer composition, a photoresist composition, a photolithographic composition, a cosmetic product, an agrochemical, a floor polish or a hydrophobicizing composition for textile finishing or glass treatment.

20. A film produced by curing a composition according to claim 18.

21. A product having a coating comprising at least one polymer according to claim 1.

22. A process for the preparation of a polymer comprising:
(a) polymerizing at least one monomer of formulae (I) or (II) to obtain a polymer according to claim 1

$$(Rf_1-CHF-CF_2-O-CHR_1)_{m1}-L_1-(X_1)_{n1} \quad (I)$$

$$(Rf_2-CHF-CF_2-S-CHR_2)_{m2}-L_2-(X_2)_{n2} \quad (II)$$

wherein
Rf$_1$ and Rf$_2$ are each, independently of one another, a perfluorinated alkyl group optionally containing heteroatoms,
R$_1$ and R$_2$ are each, independently of one another, H or an alkyl group,
L$_1$ and L$_2$ are each, independently of one another, a single bond or a bivalent organic group,
X$_1$ and X$_2$ are each, independently of one another, an acrylate or a methacrylate group,
m$_1$ and m$_2$ are each, independently of one another, another ≥1
and n$_1$ and n$_2$ each, independently of one another, another ≥1, in a composition comprising at least one initiator, optionally at least one solvent, and optionally at least co-monomer, and (b) optionally isolating the polymer.

* * * * *